US006319573B1

(12) United States Patent
Lokken

(10) Patent No.: US 6,319,573 B1
(45) **Date of Patent: *Nov. 20, 2001**

(54) HEAT SHIELD

(75) Inventor: Oddvin Lokken, Rye, NY (US)

(73) Assignee: LifeTech Systems, Inc., Fairfax, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/019,089

(22) Filed: Feb. 5, 1998

Related U.S. Application Data

(63) Continuation-in-part of application No. 08/968,998, filed on Nov. 12, 1997, now Pat. No. 6,125,941.

(51) Int. Cl.$^7$ ............................ B01D 39/00; B65D 33/14

(52) U.S. Cl. ....................... 428/34.7; 428/34.5; 428/35.2; 206/204; 206/484; 383/22; 169/48; 169/50; 210/502.1

(58) Field of Search .................................. 428/35.2, 35.5, 428/34.5, 34.6, 34.7; 206/204, 484, 484.1; 383/22, 24; 169/49, 48, 50; 210/502.1

(56) References Cited

U.S. PATENT DOCUMENTS

| | | | | |
|---|---|---|---|---|
| 4,588,505 | * | 5/1986 | Walley et al. | 206/204 |
| 5,139,841 | * | 8/1992 | Makoui et al. | 428/109 |
| 5,297,847 | * | 3/1994 | Clark | 297/217 |
| 5,356,678 | * | 10/1994 | Heitzhaus et al. | 428/35.2 |
| 5,506,012 | * | 4/1996 | Wright et al. | 428/35.2 |
| 5,516,569 | * | 5/1996 | Veith et al. | 428/68 |
| 6,125,941 | * | 10/2000 | Lokken | 169/50 |

* cited by examiner

*Primary Examiner*—Rena L. Dye
(74) *Attorney, Agent, or Firm*—Eugene C. Rzucidlo; Greenberg Traurig, LLP

(57) ABSTRACT

A heat shield has a generally planar, sealed container having opposed, planar, water-permeable, heat-resistant front and rear members, and a highly water-absorbent polymer inside the container, the members being operable to allow passage of water into the interior of said container to swell the water-absorbent polymer.

3 Claims, 1 Drawing Sheet

HEAT SHIELD

This application is a continuation-in-part of my application Ser. No. 08/968,998, now U.S. Pat. No. 6,125,941 filed Nov. 12, 1999, which is incorporated herein by reference thereto.

The present invention relates to a heat shield for use in a wide variety of applications in which it is necessary to protect a structure against the adverse effects of heat.

In one embodiment of the invention, the heat shield will be used to protect a surface adjacent to a workpiece subjected to an open flame or other high temperature source, such as during soldering. In another embodiment of the invention, the heat shield can be used as a fire-barrier to protect a structure from the effects of a fire.

The present invention is illustrated in terms of its preferred embodiments in the accompanying drawings, in which.

Figure 1:
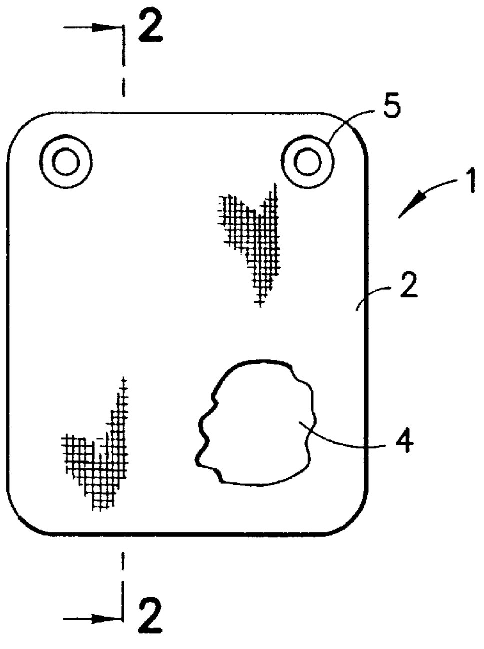
FIG. 1 is a plan view of the heat shield of the present invention with parts broken away.
Figure 2:
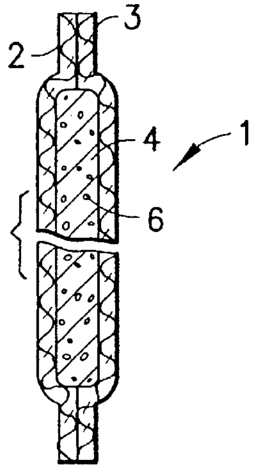
FIG. 2 is a view in section taken along the lines 2—2 in FIG. 1.

Referring to FIGS. 1 and 2, the generally flat heat shield 1 of the present invention has opposed front planar face 2 and rear planar face 3 that together enclose an inner layer 4. The upper portion of heat shield 1 has two grommets 5 passing through the device to facilitate hanging the heat shield 1 on studs, pegs, nails or the like.

The faces 2 and 3 are made of a highly heat-resistant, water-permeable material, such as a fiberglass fabric that has been treated to remove flammable materials. Such a fabric is commercially available from Ametek in Willmington, Delaware and is known as SILTEMP fabric. Any other suitable heat-resistant fabric can be used. In its most preferred embodiment, the heat-resistant fabric will have a melting point greater than 3000° F., such as the SILTEMP fabric. The heat shield 1 can be formed in any conventional manner, such as by sewing or otherwise fastening the faces 2 and 3 together to form an enclosure for the layer 4.

The internal layer 4 is shown in FIGS. 1 and 2 as a self-supporting layer having particles 6 of a water-absorbent polymer secured thereto, as by suitable adhesive. Water-absorbent polymers useful in the present invention are any of the polymers disclosed in U.S. Pat. Nos. 3,669,103, 3,670,731 and 3,935,099. Useful polymers disclosed in U.S. Pat. No. 3,669,103 include polyvinylpyrrolidones, sulfonated polystyrenes, sulfonated polyvinyltoluenes polysulfoethyl acrylates, poly-2-hydroxyethyl acrylates, polyacrylates, hydrolyzed polyacrylamides, and copolymers of acrylamide and acrylic acid. Useful polymers disclosed in U.S. Pat. No. 3,670,731 include cross linked acrylamides, cross linked sulfonated polystyrene, and mixtures of these polyacrylamides and polystyrenes. Useful polymers disclosed in U.S. Pat. No. 3,935,099 include water-insoluble alkali salts of aqueous alkali saponified gelatinized starch/polyacrylonitrile graft polymers, which contain gelatinized starch (GS) and saponified polyacrylonitrile (HPAN) in molar ratios of from about 1:1.5 to 1:9 GS:HPAN. As is known, commercially available starch-graft co-polymers containing gelatinized starch and saponified polyacrylonitrile made in accordance with U.S. Pat. No. 3,935,099 can absorb from about 500 to as much as 1000 times their weight in water. It is presently preferred to use as the water-absorbent polymer a co-polymer consisting of 2-propenamide and 2-propanoic acid sodium salt sold by Grain Processing Corporation of Muscatine, Iowa under the trademark WATERLOCK SUPER ABSORBENT POLYMER G-400.

If desired, the internal layer 4 can also have secured thereto fibers or films of the desired water-absorbent polymer.

Figure 3:
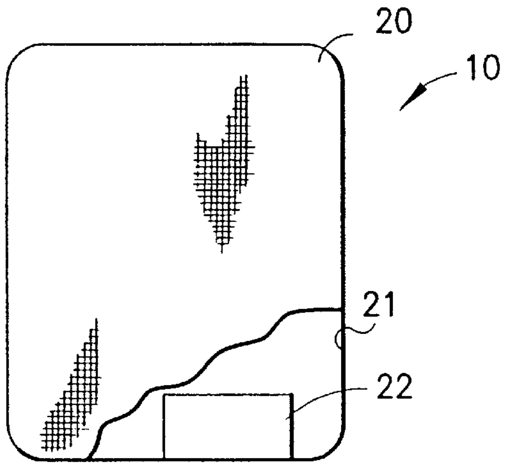
FIG. 3 is a plan view of another embodiment of the heat shield of the invention, with parts broken away.
Figure 4:
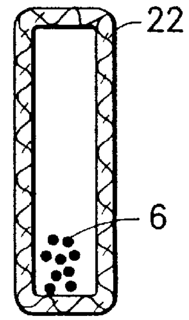
FIG. 4 is a view in section of an element of the heat shield shown in FIG. 3.

FIGS. 3 and 4 illustrate an alternative embodiment of the invention, in which the planar heat shield 10 comprises opposed water-permeable planar faces 20 and 21, in which is disposed an internal bag or container 22 filled with particles, films or the like of the desired water-absorbent polymer. The bag or container 22 is made of a water-disintegratable material, such as tissue paper.

While the planar heat shield 1 is provided with grommets 5 in one embodiment of the invention, so that the heat shield can be secured in position behind the object exposed to an open flame or other source of high temperature, as shown in FIGS. 3 and 4, however, the heat shield of the invention may also be in the form of a blanket or the like that does not include grommets.

The faces 2, 3 and 20, 30 are water-permeable. This may be accomplished by weaving or knitting a heat-resistant fiber, such as a fiberglass fiber, to form a fabric that allows external water to pass through the spaces between adjacent fibers into the interior of the heat shield. Alternatively, the faces 2, 3 and 20, 21 may be formed of perforated heat-resistant sheets that will allow water to pass through the perforations into the interior of the heat shield. In a preferred embodiment, the heat shields 1 and 10 are flexible so that they can conform to the shape of the object to be protected.

It is an essential feature of the present invention that the planar heat shield be prefabricated and self-supporting. As such, the heat shield is portable and can be manufactured in one location, stored in another location and ultimately delivered to the consumer ready-to-use. Typically, a heat shield used as a heat protection material for welding and soldering will be about 6 to 12 inches in length by 6 to 12 inches in height, and less than about 1 inch in thickness. For a heat shield of these dimensions, the amount of the water-absorbent polymer may be from about one-half ounce to about one ounce. Larger heat shields will contain larger amounts of the water-absorbent polymer in proportion to the size of the heat shield.

In use, the heat shield 1 or 10 will disposed behind the object to be soldered or otherwise subject to high heat, using the grommets 5 to hang the heat shield in place. Prior to use, the heat shield 1 or 10 is thoroughly wetted, either with a soaking water spray or immersion in water. The water passes through the water-permeable faces 2,3 or 20, 21 whereby the water-absorbent polymer swells up to about 1000 times its weight to thus provide a large amount of a heat-aborting absorbing water barrier. For example, 1 ounce of water-absorbent polymer in a heat shield about six to about 12 inches square can swell to up to about 60 pounds, so that the bag will contain up to 60 pounds of water packed into a very small space. This provides an extremely efficient heat sink that can absorb very large quantities of heat.

The wetted heat shield 1 or 10 is desirably positioned under or behind the working area not only to protect the area adjacent to the working area but to catch the sparks or hot metals. The wetted heat shield 1 will also act to protect adjacent areas or materials from heat build-up. After use, the wetted heat shield can be stored in a sealed package, such as a conventional sealable plastic bag to keep the heat shield moist.

When used as a fire barrier, the wetted heat shield 10 will be placed over or on the surface or object to be protected and the large amount of water inside the heat shield 10 will thus act to absorb heat and thus protect the object.

In an alternative embodiment of the invention, the layer 4 or the container or receptacle 22 may be provided with sodium bicarbonate which, when wetted, will form a heat-resistant slurry.

What is claimed is:

1. A heat shield, comprising a generally planar, sealed container having opposed, planar, water-permeable, heat-resistant front and rear members made of fiberglass fabric which has been treated to remove flammable materials, and a highly water-absorbent polymer inside said container, said members being operable to allow passage of water into the interior of said container to swell said water-absorbent polymer, and wherein the heat shield further comprises upper and lower edges, and wherein grommets are provided at the upper edge.

2. The heat shield according to claim 1, wherein said members are each capable of withstanding a temperature of about 3000° F.

3. The heat shield according to claim 1, wherein said water absorbent polymer will absorb at least about 500 times its weight in water.

* * * * *